United States Patent [19]

Caviness

[11] 4,329,037
[45] May 11, 1982

[54] CAMERA STRUCTURE

[75] Inventor: Theodore G. Caviness, Philadelphia, Pa.

[73] Assignee: Container Corporation of America, Chicago, Ill.

[21] Appl. No.: 271,425

[22] Filed: Jun. 8, 1981

[51] Int. Cl.³ .............................................. G03B 17/04
[52] U.S. Cl. .................................... 354/187; 206/316; 354/288
[58] Field of Search .............................. 354/187–194, 354/202, 203, 288, 276, 278, 279, 185; 206/316, 578

[56] References Cited

U.S. PATENT DOCUMENTS

| | | | |
|---|---|---|---|
| 360,499 | 4/1887 | Whittell | 354/187 |
| 582,855 | 5/1897 | Freeman | 354/187 X |
| 844,152 | 2/1907 | Little | 354/187 X |
| 948,939 | 2/1910 | Thornton | 354/288 |
| 1,191,066 | 7/1916 | Cramer | 354/288 |
| 1,222,310 | 4/1917 | Lichtman | 354/288 |
| 1,298,312 | 3/1919 | Earle | 354/187 X |
| 1,366,158 | 1/1921 | Brown | 354/187 |
| 2,559,214 | 7/1951 | Fried | 354/187 |
| 2,612,092 | 9/1952 | Heyer et al. | 354/288 X |
| 2,751,825 | 6/1956 | Fried | 354/288 |
| 3,640,195 | 2/1972 | Zimmerman et al. | 354/288 X |

*Primary Examiner*—John Gonzales
*Attorney, Agent, or Firm*—Richard W. Carpenter; Davis Chin

[57] ABSTRACT

A pinhole type camera is in the shape of a polyhedron and is formed from a cut and scored blank of paperboard. It is provided with a separate structure formed from a second cut and scored blank and disposed within the hollow polyhedron, the separate structure constraining photo-sensitive material along side edges thereof into position.

3 Claims, 12 Drawing Figures

U.S. Patent May 11, 1982 Sheet 1 of 3 4,329,037
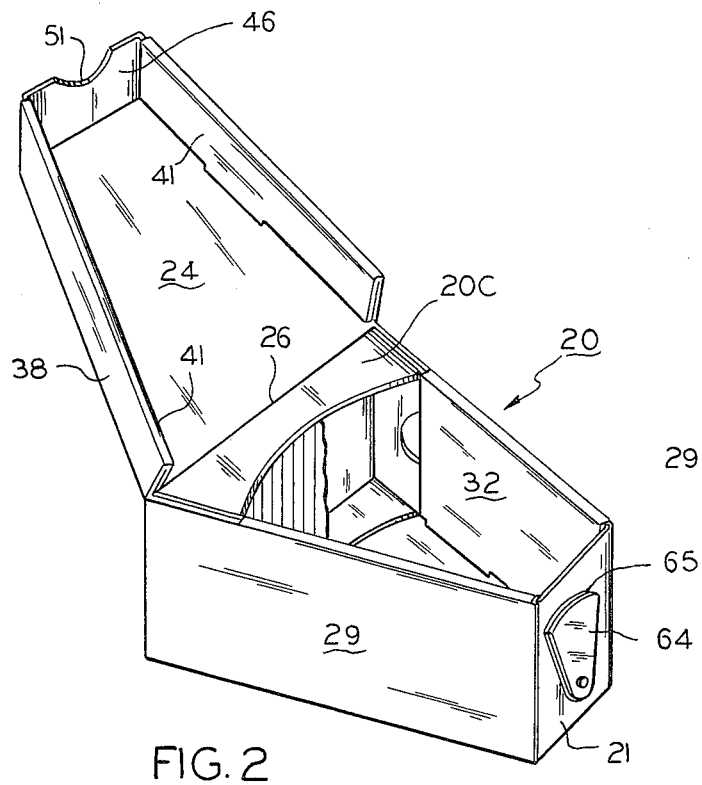
FIG. 2
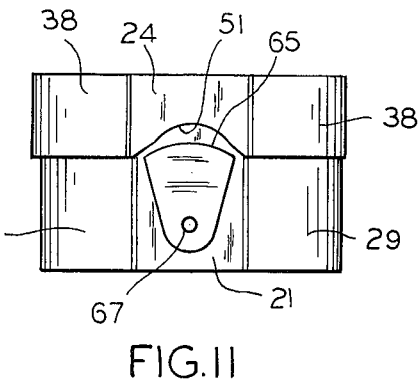
FIG. 11
FIG. 12
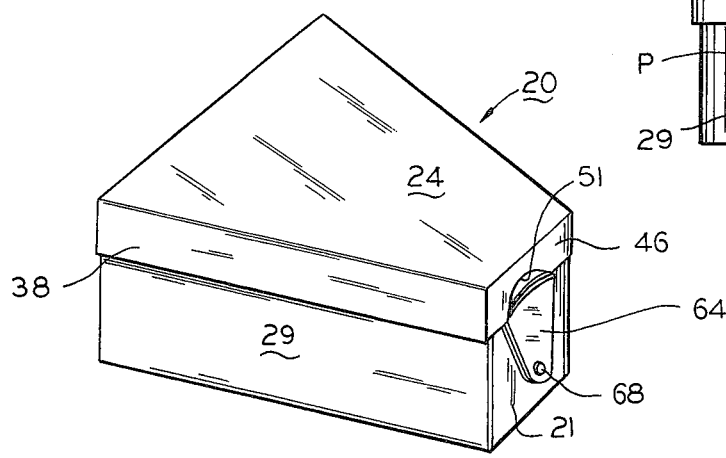
FIG. 1
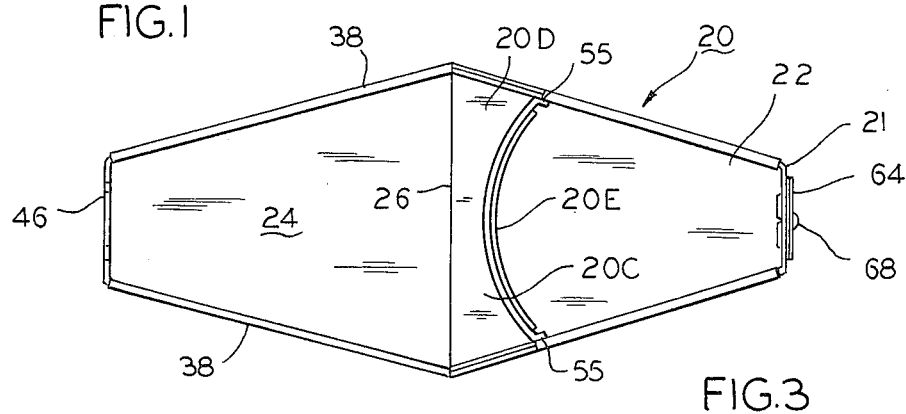
FIG. 3

U.S. Patent  May 11, 1982  Sheet 3 of 3  4,329,037
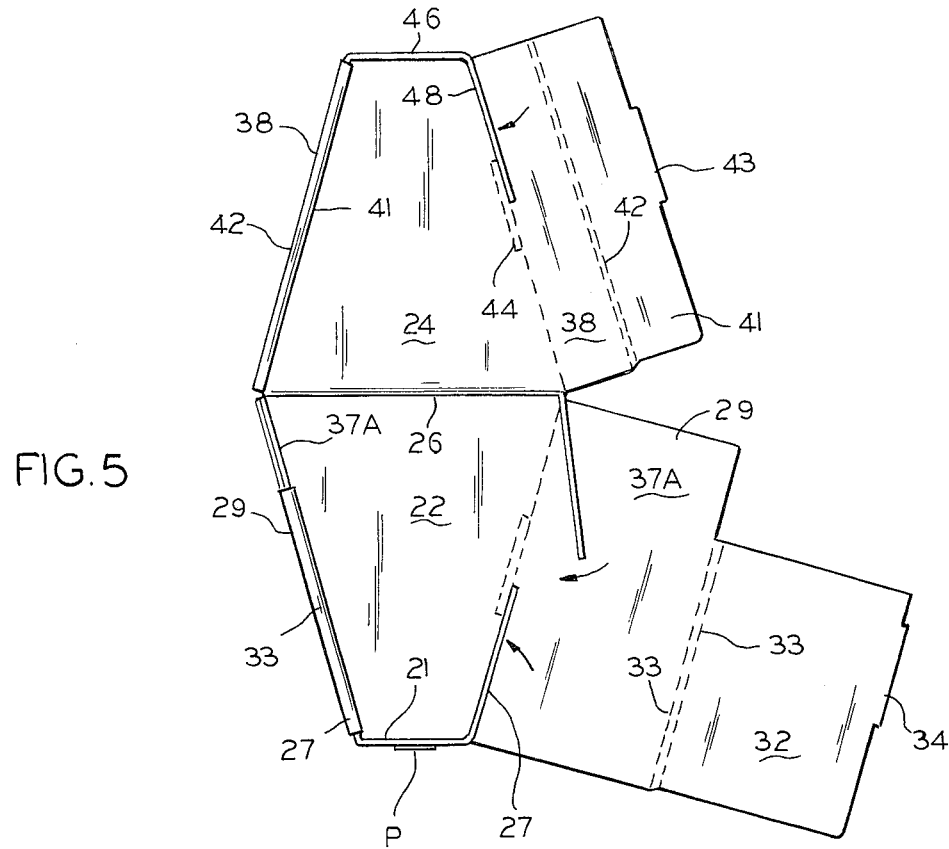
FIG. 5
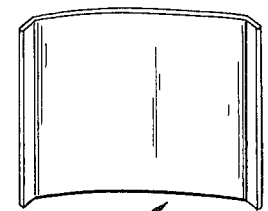
FIG. 8
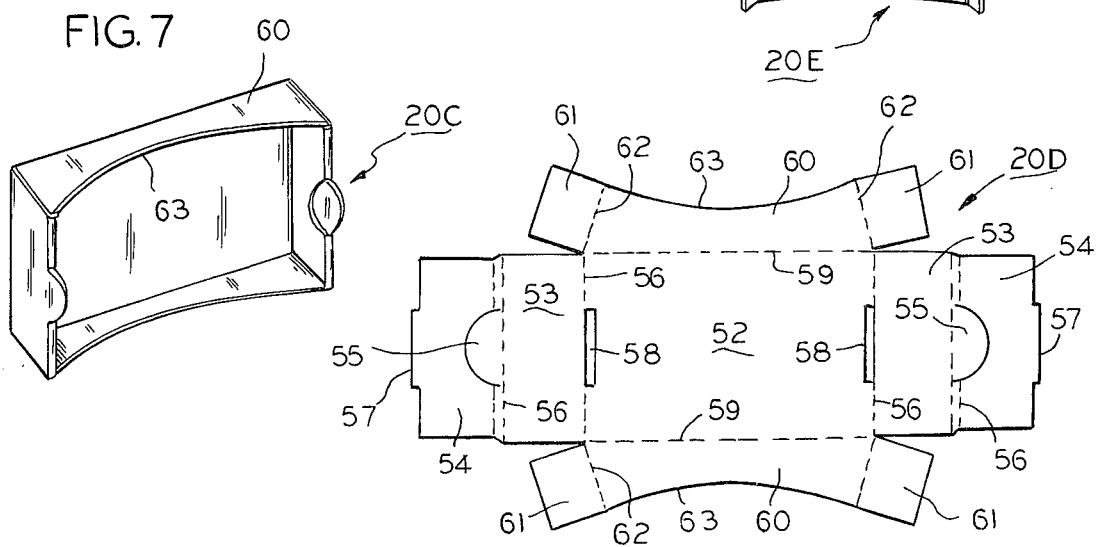
FIG. 7
FIG. 6

CAMERA STRUCTURE

BACKGROUND OF THE INVENTION

1. Field of the Invention

The structure comprehended herein is for the purpose of teaching the basics of photography without the need of costly and complicated shutters, lenses and film winding apparatus.

2. Description of the Prior Art:

The following U.S. Pat. Nos. were developed in a search of the prior art relating to cameras of the pinhole and simple lense and shutter type:

Cramer: 1,191,066
Brown: 1,366,158
Farago: 1,764,251
Fried: 2,751,825
Watts: 3,623,650
Zimmerman et al. 3,640,195
Tolaas: RE 29,185

Of the above patents, Brown and Farago show containers in the form of a polyhedron, but apart from being remote from the camera art they are wholly lacking in any teaching of structure for holding photo-sensitive material in position. Tolaas is merely of interest in the teaching of a container of triangular shape when viewed in plan. The remaining patents are merely of general interest showing the state of the art, and in nowise teach a structure as disclosed herein.

SUMMARY OF THE INVENTION

The disclosed structure is for the purpose of illustrating basic principles in the camera art. The structure can be formed from a pair of cut and scored blanks which can readily be assembled to form the camera structure.

BRIEF DESCRIPTION OF THE DRAWINGS

FIG. 1 is a perspective view of a camera embodying the invention;

FIG. 2 is a similar view, and showing structure for placing of photo-sensitive material into position therewithin;

FIG. 3 is a plan view of FIG. 2;

FIG. 5 is a plan view showing steps in the forming of the blank of FIG. 4;

FIG. 6 is a plan view of a cut and scored blank for forming structure for placing of photo-sensitive material within the structure seen in FIGS. 2 and 3;

FIG. 7 is an isometric view showing the blank of FIG. 6 in erected position;

FIG. 8 is an elevational view showing photo-sensitive material adapted to be exposed within the camera according to the invention;

FIGS. 11 and 12 are elevational views showing the manner in which the structure of FIGS. 9 and 10 is manipulated in uncovering the camera aperture.

DESCRIPTION OF THE PREFERRED EMBODIMENT

Figure 4:
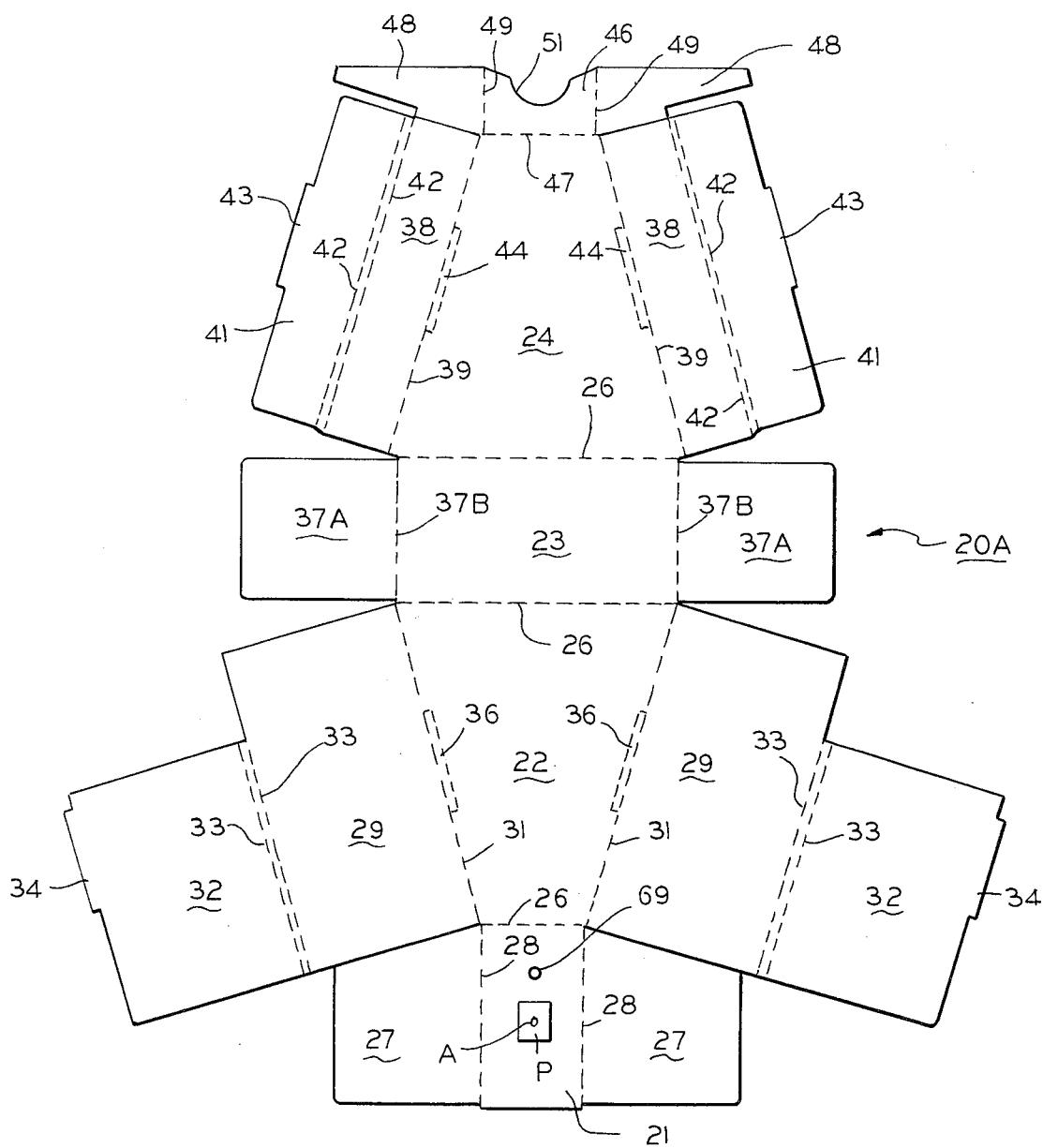
FIG. 4 is a plan view of a cut and scored blank for forming the structure of FIGS. 1 to 3.

Referring now to the drawings, the camera structure is referred to by the reference numeral 20 and is formed from a cut and scored blank 20A. When blank 20A is erected, it encloses a support 20C, see FIG. 7, formed from a cut and scored blank 20D seen in FIG. 6. Support 20C is for a blank 20E of photo-sensitive material to be exposed to light when supported within camera 20. As will be explained, camera 20 is of the pinhole or camera obscura type.

It is formed from cut and scored blank 20A consisting of rectangular front panel 21, trapezoid-shaped bottom panel 22, rectangular rear panel 23 and trapezoid-shaped top panel 24, all these panels being connected in the order named and foldable to position along parallel score lines 26 therebetween.

Front panel 21 has opposed side panels 27 foldable with respect thereto along fold lines 28. Bottom trapezoid-shaped panel 22 also has opposed outer side panels 29 folded with respect thereto along fold lines 31, and inner panels 32 are foldable with respect to outer side panels 29 along closely spaced fold lines 33, the panels 27 being captured between panels 29 and 32, the latter having Walker tabs 34 locked into Walker slots 36 in the sides of bottom panel 22.

In like fashion rear panel 23 has opposed flaps 37A foldable with respect to panel 23 along opposed fold lines 37B, flaps 37A being held between outer side panel 29 and inner side panel 32.

A cover is provided for the structure thus far described, and trapezoid-shaped top panel 24 foldable with respect to end wall 23 along fold line 26 is provided with outer side panels 38 foldable with respect to top panel 24 along score lines 39. Outer side panels 38 have inner side panels 41 foldable with respect thereto along closely spaced fold lines 42, and inner panels 41 are locked to top panel 24 by Walker tabs 43 and Walker slots 44 in top panel 24.

An end wall for the cover thus far described is denoted by numeral 46 and is foldable with respect to panel 24 along fold lines 47. End wall 46 has opposed flaps 48 foldable with respect thereto along opposed fold lines 49, and flaps 48 are held between folded together flaps 38 and 43 to complete the cover assembly. End wall 46 has an arcuate-shaped cutout 51 for a purpose as will appear.

Structure 20C is provided for holding the photo-sensitive material 20E in position within the camera thus far described, and it is formed from the second blank 20D which has a main panel 52 flanked by opposed pairs of side flanges 53 and 54. These are joined to each other and to panel 52 by score lines 56. Flange 54 has a Walker tab 57 adapted to lock with Walker slot 58 in panel 52.

Main panel 52 has opposed upper and lower flange elements 60 joined to panel 52 along fold lines 59. Tabs 61 at each end of the flange elements 60 are foldable with respect thereto along score lines 62, and tabs 61 are held between the confronting flanges 53 and 54.

Flange elements 60 have curved edges 63, and the photosensitive material 20E seen in FIG. 8 is constrained at its side edges by tabs 55 to fit against the curved edges 63 as seen particularly in FIG. 3.

The erected structure 20C is placed within camera 20 against the inside of rear wall 23 with flanges 53 against the interior of flaps 37A.

Figure 9:
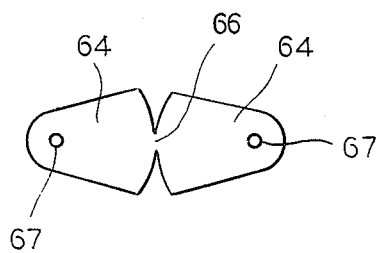
FIGS. 9 and 10 are plan views of structure for covering the camera aperture.
Figure 10:
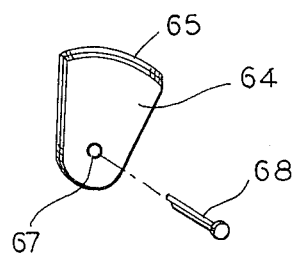

Front wall 21 is provided with a patch P having an aperture A therein through which light can pass to expose material 20E. Aperture A is closed by a mask made of two halves 64 connected at 66 as shown in FIG. 9. The two halves 64 are folded together and each has an opening 67 through which a staple 68 is passed as best seen in FIG. 10. Staple 68 passes through an opening, not shown, in wall 21 to hold masks 64 in position.

Mask 64 can be swiveled to position to open aperture A to admit light to the interior of structure 20. The arcuate-shaped cutout 51 in end cover wall 46 and the curved surface 65 of mask 64 enables the latter to be swiveled about staple 68.

The interior surfaces of structure 20 are blackened, as is conventional in the camera art.

What is claimed is:

1. A camera in the form of a hollow polyhedron having structure therein for holding photo-sensitive sheet material in position by constraining the sheet along opposite sides thereof, said camera and said structure being formed from a pair of cut and scored blanks of paperboard or the like and comprising:
    (a) a first blank having foldably connected rectangular front, trapezoidal-shaped top and bottom and rectangular rear panels;
    (b) side panels foldably connected to said panels and foldable into erected position to define a structure of polyhedron shape;
    (c) certain of the side panels being foldable with respect to said trapezoidal-shaped top panel and providing a cover extending over the side panels extending from said trapezoid-shaped bottom panel and said front rectangular panel;
    (d) a second blank for forming a structure constraining said film material in position close to said rear panel and having a main panel with opposed side and opposed upper and lower flange elements extending from said main panel and foldably connected thereto;
    (e) said upper and lower flange elements having curved edges against which photo-sensitive film material is constrained; and
    (f) an aperture in said front panel for transmitting light therethrough against said photo-sensitive material when in position close to said main panel.

2. A camera according to claim 1, wherein said second blank provides tabs constraining said film material along the side thereof.

3. A camera according to claim 1, wherein said front panel is provided with a mask swivelable between opening and closing positions with respect to said aperture.

* * * * *